United States Patent
Dry et al.

(10) Patent No.: US 10,759,305 B2
(45) Date of Patent: Sep. 1, 2020

(54) VEHICLE SEATING ASSEMBLY

(71) Applicant: Ford Global Technologies, LLC, Dearborn, MI (US)

(72) Inventors: Alan George Dry, Grosse Pointe Woods, MI (US); Daniel Ferretti, Commerce Township, MI (US); Johnathan Andrew Line, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 112 days.

(21) Appl. No.: 16/204,308

(22) Filed: Nov. 29, 2018

(65) Prior Publication Data

US 2020/0171982 A1    Jun. 4, 2020

(51) Int. Cl.
| | | |
|---|---|---|
| *B60N 2/02* | (2006.01) | |
| *B60N 2/06* | (2006.01) | |
| *B60N 2/07* | (2006.01) | |
| *B60N 2/005* | (2006.01) | |
| *B60R 16/03* | (2006.01) | |
| *B60R 16/027* | (2006.01) | |

(52) U.S. Cl.
CPC ........... *B60N 2/0224* (2013.01); *B60N 2/005* (2013.01); *B60N 2/062* (2013.01); *B60N 2/0732* (2013.01); *B60R 16/027* (2013.01); *B60R 16/03* (2013.01)

(58) Field of Classification Search
CPC ........ B60N 2/005; B60N 2/02; B60N 2/0224; B60N 2/0232; B60N 2/0292; B60N 2/04; B60N 2/06; B60N 2/062; B60R 16/027; B60R 16/03

USPC .................. 296/65.01, 63.13, 65.15
See application file for complete search history.

(56) References Cited

U.S. PATENT DOCUMENTS

| | | | |
|---|---|---|---|
| 2,426,582 A | 9/1947 | Austin | |
| 4,341,415 A | 7/1982 | Braun et al. | |
| 5,000,505 A | 3/1991 | Kawashita et al. | |
| 5,636,884 A | 6/1997 | Ladetto et al. | |
| 5,911,465 A | 6/1999 | Yamamoto et al. | |
| 5,951,106 A | 9/1999 | Hirama et al. | |
| 6,145,911 A * | 11/2000 | Sturt ................ | B60N 2/071 |
| | | | 296/65.01 |
| 6,168,234 B1 | 1/2001 | Haynes et al. | |
| 6,457,765 B1 | 10/2002 | Bergquist et al. | |
| 6,666,514 B2 | 12/2003 | Muraishi et al. | |
| 6,981,746 B2 | 1/2006 | Chung et al. | |
| 7,108,325 B2 | 9/2006 | Williamson et al. | |
| 7,357,451 B2 | 4/2008 | Bendure et al. | |
| 7,441,822 B1 | 10/2008 | Day | |
| 7,658,258 B2 | 2/2010 | Denney | |
| 7,708,331 B2 * | 5/2010 | Yamasaki .......... | B60N 2/062 |
| | | | 296/65.13 |

(Continued)

FOREIGN PATENT DOCUMENTS

| | | | | |
|---|---|---|---|---|
| DE | 102009059126 A1 * | 7/2010 | ......... | B60N 2/01575 |
| EP | 3150426 A1 | 4/2017 | | |
| FR | 2728860 A1 * | 7/1996 | ............ | B60N 2/062 |

*Primary Examiner* — Jason S Daniels
(74) *Attorney, Agent, or Firm* — David Coppiellie; Price Heneveld LLP

(57) ABSTRACT

A vehicle seating assembly includes an actuation carriage coupled to an underside thereof, a plurality of anchors extending from the actuation carriage, each of the anchors being rotatable about a fixed vertical axis, and a plurality of rollers rotatably coupled to each of the anchors by an axle.

20 Claims, 15 Drawing Sheets

(56) References Cited

U.S. PATENT DOCUMENTS

| | | |
|---|---|---|
| 7,950,740 B2 | 5/2011 | Bunea et al. |
| 9,114,730 B1 | 8/2015 | Hudson et al. |
| 10,596,925 B2 * | 3/2020 | Dry ................... B60N 2/0715 |
| 10,632,865 B2 * | 4/2020 | Dry ................... B60N 2/0232 |
| 2009/0195037 A1 | 8/2009 | Plavetich et al. |
| 2017/0267124 A1 * | 9/2017 | Numazawa ............. B60N 2/06 |

* cited by examiner

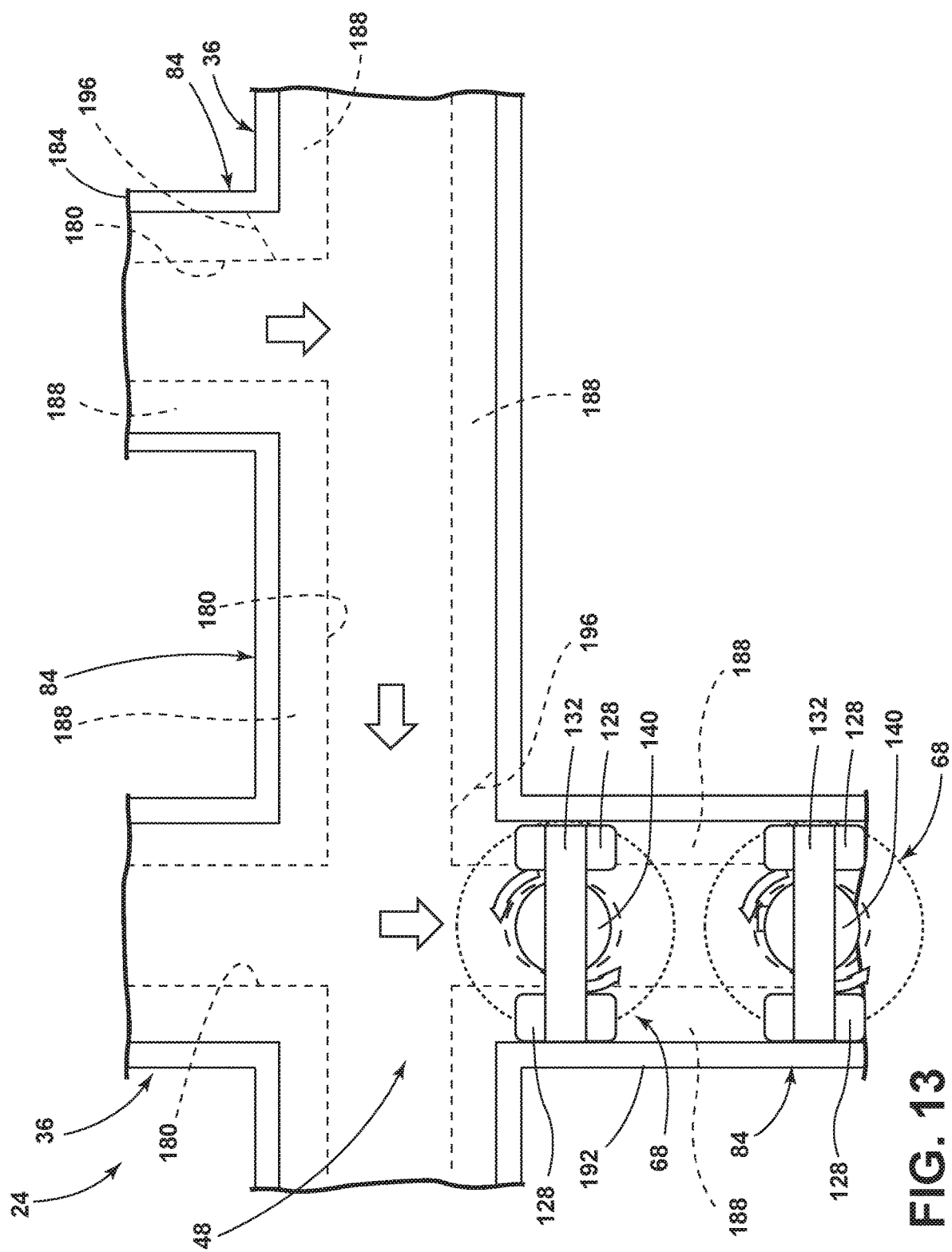

VEHICLE SEATING ASSEMBLY

FIELD OF THE DISCLOSURE

The present disclosure generally relates to a seating assembly. More specifically, the present disclosure relates to a vehicle seating assembly.

BACKGROUND OF THE INVENTION

Vehicles are often provided with seating assemblies that have various functionalities that can be controlled by a user. These vehicle seating assemblies are often capable of removal from the vehicle. However, additional solutions are needed for reconfigurable interiors of the vehicle to meet varied needs and preferences of users over time.

SUMMARY OF THE INVENTION

According to a first aspect of the present disclosure, a vehicle seating assembly includes an actuation carriage coupled to an underside thereof and a plurality of anchors extending from the actuation carriage. Each of the anchors is rotatable about a vertical axis. A plurality of rollers are rotatably coupled to each of the anchors by an axle.

Embodiments of the first aspect of the present disclosure can include any one or a combination of the following features:
- the vehicle seating assembly is installed in a vehicle;
- the plurality of anchors selectively engage with a network of rails positioned in a cabin of the vehicle;
- the plurality of anchors includes active anchors and passive anchors;
- the active anchors are provided with at least one of power connectors and data connectors;
- the network of rails are provided with a power source that is engaged by the power connectors;
- the network of rails are provided with data transmitters that engage with the data connectors;
- the axle defines a horizontal axis of rotation of the rollers; and
- the rollers remain substantially fixed in longitudinal and lateral directions relative to the anchors.

According to a second aspect of the present disclosure, a vehicle seating assembly includes an actuation carriage coupled to an underside thereof and a plurality of anchors extending from the actuation carriage. Each of the anchors is rotatable about a vertical axis. A plurality of rollers are rotatably coupled to each of the anchors by an axle. The axle defines a horizontal axis of rotation. The rollers remain substantially fixed in longitudinal and lateral directions relative to the anchors.

Embodiments of the second aspect of the present disclosure can include any one or a combination of the following features:
- the plurality of anchors selectively engage with a network of rails positioned in a cabin of a vehicle;
- the plurality of anchors includes active anchors and passive anchors;
- the active anchors are provided with at least one of power connectors and data connectors;
- the network of rails are provided with a power source that is engaged by the power connectors; and
- the network of rails are provided with data transmitters that engage with the data connectors.

According to a third aspect of the present disclosure, a vehicle includes a vehicle seating assembly. An actuation carriage is coupled to an underside of the vehicle seating assembly. A network of rails is positioned in a cabin of the vehicle. A plurality of anchors extend from the actuation carriage to engage with the network of rails. Each of the anchors is rotatable about a fixed vertical axis. A plurality of rollers are rotatably coupled to each of the anchors by an axle. The axle defines a horizontal axis of rotation. The rollers remain substantially fixed in longitudinal and lateral directions relative to the anchors.

Embodiments of the third aspect of the present disclosure can include any one or a combination of the following features:
- the plurality of anchors include active anchors and passive anchors;
- the active anchors are provided with at least one of power connectors and data connectors;
- the network of rails are provided with a power source that is engaged by the power connectors; and
- the network of rails are provided with data transmitters that engage with the data connectors.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 13 is a top view of junctions of the network of rails with the anchors traversing the second longitudinal rail, according to one example.

DETAILED DESCRIPTION OF THE PREFERRED EMBODIMENTS

Figure 1A:
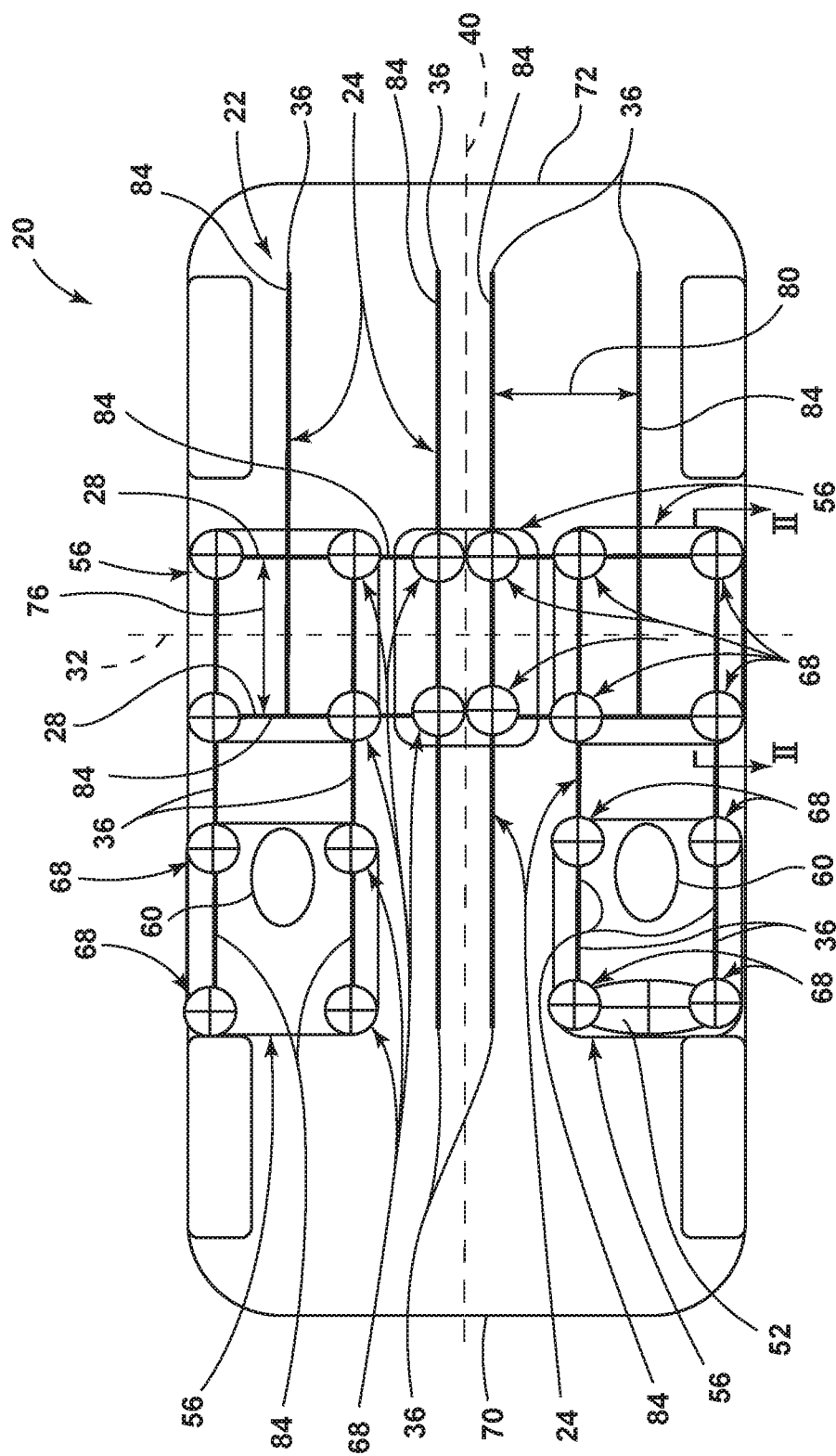
FIG. 1A is a schematic view of a cabin of a vehicle, illustrating a first configuration of a number of seating assemblies, according to one example.

For purposes of description herein, the terms "upper," "lower," "right," "left," "rear," "front," "vertical," "horizontal," and derivatives thereof shall relate to the concepts as oriented in FIG. 1A. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a seating assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1A-13, reference numeral 20 generally designates a vehicle. A cabin 22, or interior, of the vehicle 20 can be provided with a network of rails 24. The network of rails 24 can include lateral rails 28 that extend primarily along a lateral axis 32 of the vehicle 20. The network of rails 24 can also include longitudinal rails 36 that extend primarily along a longitudinal axis 40 of the vehicle 20. The lateral and longitudinal rails 28, 36 are coupled to one another at junctions 48 within the network of rails 24.

Referring again to FIGS. 1A-1C, the vehicle 20 may be passenger driven, semi-autonomous, fully autonomous, or any combination of user-controlled and automated. For example, the semi-autonomous example of the vehicle 20 may perform many or all-commuting functions (e.g., accelerating, braking, turning, signaling, etc.) independent of user interaction while the user maintains override control of the vehicle 20. Accordingly, in some examples, the vehicle 20 may be provided with a steering wheel 52 that is positioned proximate to one of a plurality of seating assemblies 56. The seating assemblies 56 may be configured to provide various functionality to an interior or cabin of the vehicle 20. For example, the seating assemblies 56 may be utilized to support a user 60 in a seated position. Additionally or alternatively, the seating assemblies 56 may be folded to provide an ottoman, a work surface, a table 64, or the like. The seating assemblies 56 are coupled to the network of rails 24. In various examples, the seating assemblies 56 are coupled to the network of rails 24 by a plurality of anchors 68. The anchors 68 can be positioned to permit actuation along the lateral rails 28 and the longitudinal rails 36. In some examples, the plurality of anchors 68 are positioned to permit actuation along the lateral rails 28 and the longitudinal rails 36 without adjusting a longitudinal position or a lateral position of the plurality of anchors 68 relative to one another. Said another way, the anchors 68 on an individual seating assembly 56, in some examples, may remain fixed relative to one another in the lateral and longitudinal directions. While the anchors 68 may be fixed relative to one another, that does not exclude the ability of the anchors 68 to move within the network of rails 24, be provided with components that are movable (e.g., rollers, wheels, locking pins, etc.), and/or be rotatable about individual vertical axes, as will be discussed in more detail herein.

Figure 1B:
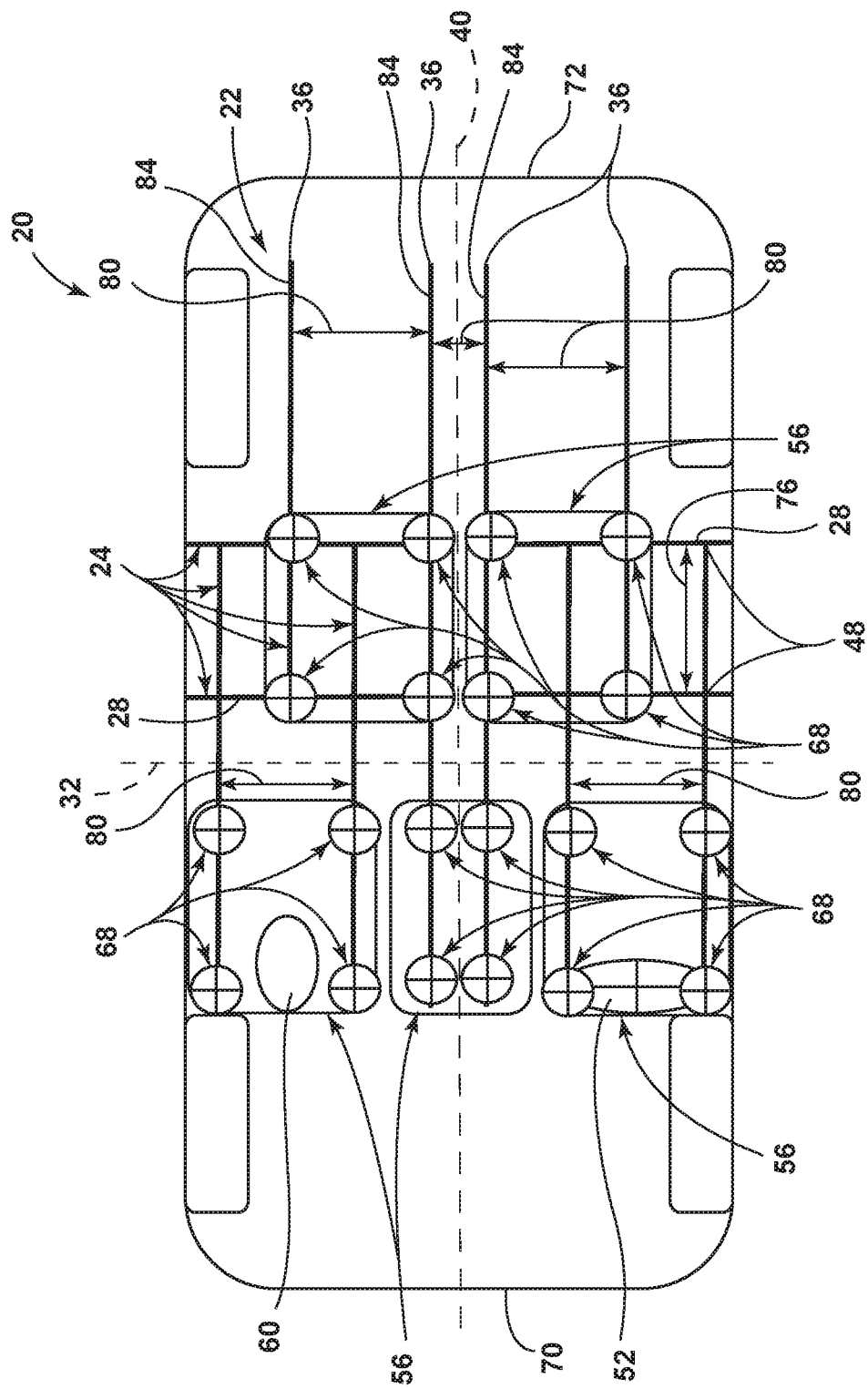
FIG. 1B is a schematic view of the cabin of the vehicle, illustrating a second configuration of the number of seating assemblies, according to one example.
Figure 1C:
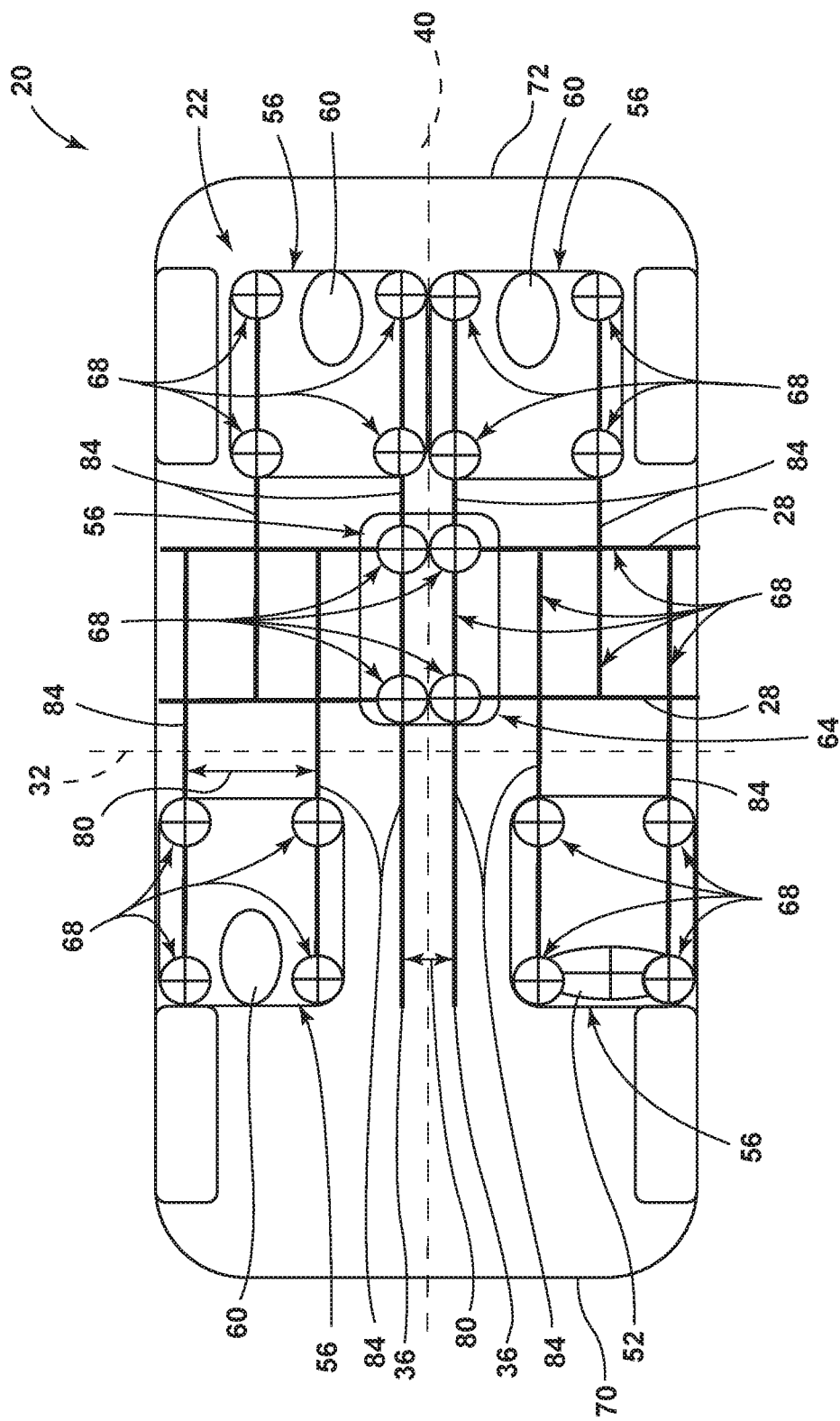
FIG. 1C is a schematic view of the cabin of the vehicle, illustrating a third configuration of the number of seating assemblies, according to one example.
Figure 2:
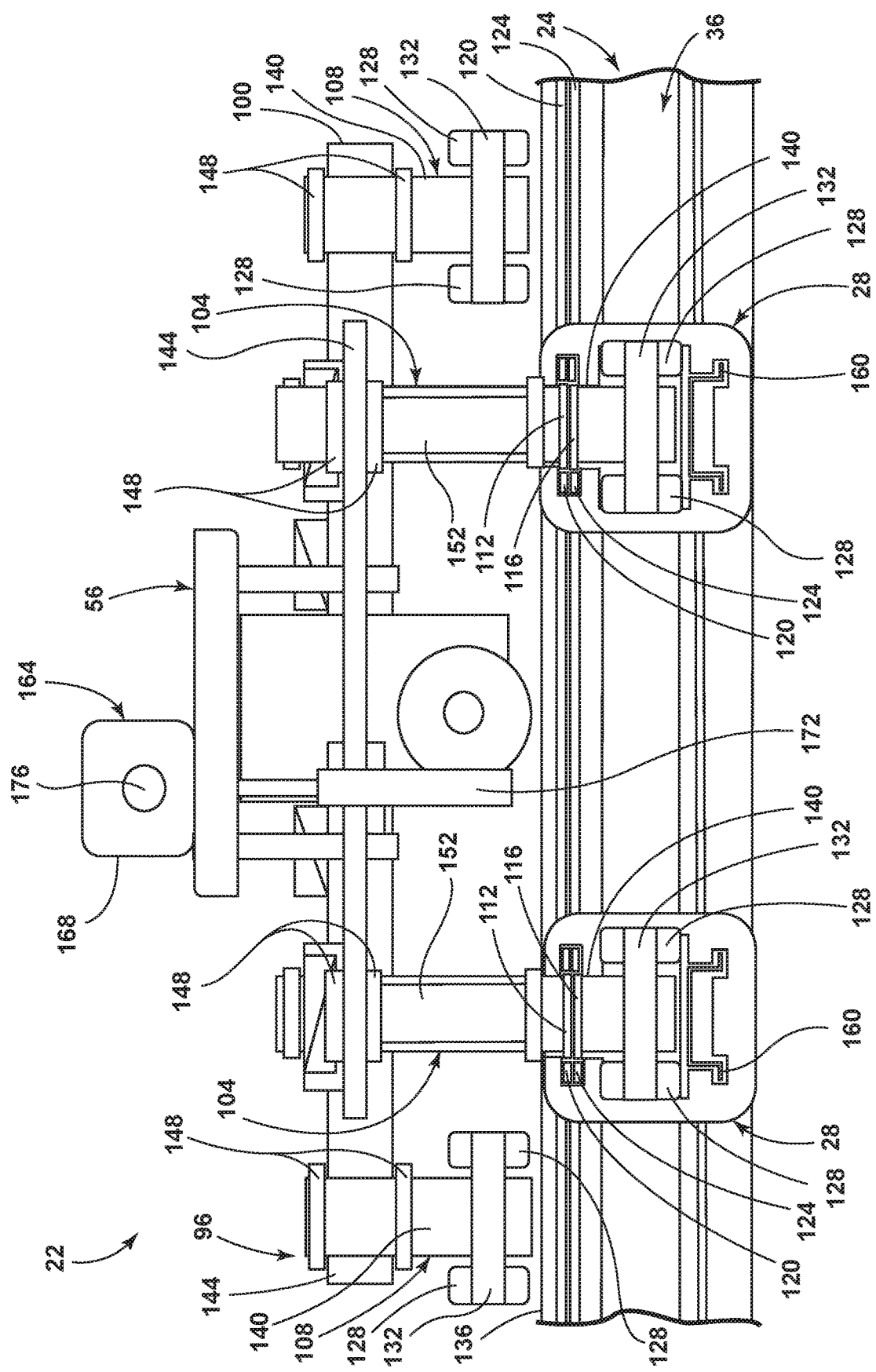
FIG. 2 is a cross-sectional view of the network of rails taken along line II-II of FIG. 1A, according to one example.
Figure 3:
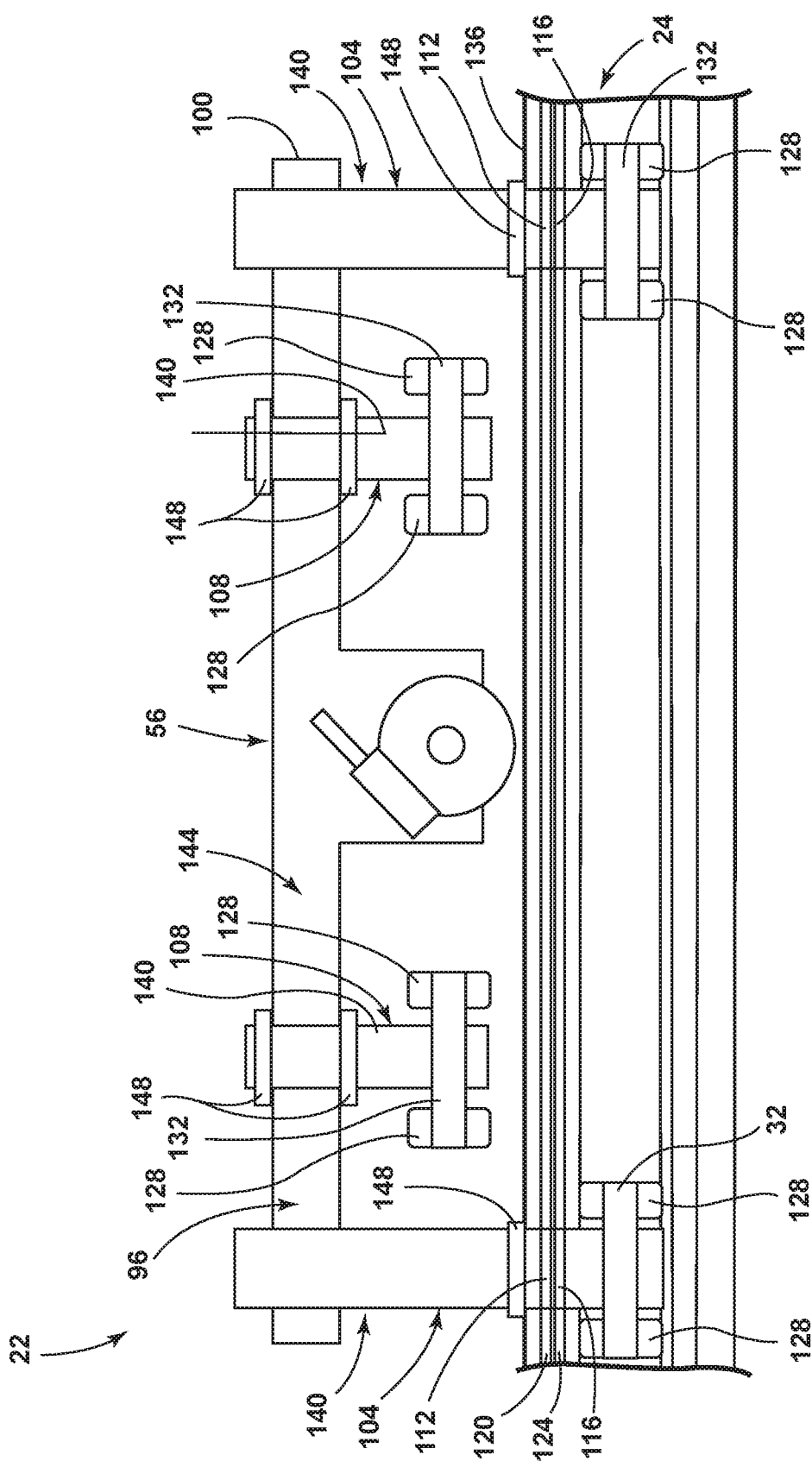
FIG. 3 is a cross-sectional view of the network of rails taken along line II-II of FIG. 1A, according to another example.
Figure 4A:
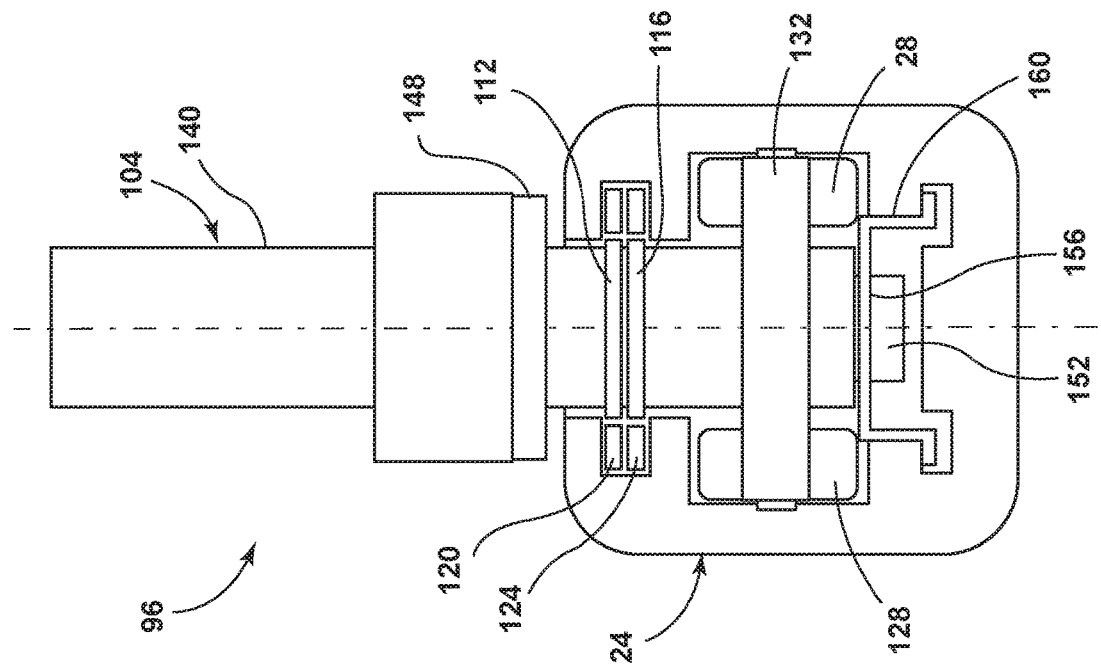
FIG. 4A is an end view of an individual track of the network of rails, illustrating an anchor engaged with the track with an actuation carriage in a lowered position, according to one example.
Figure 4B:
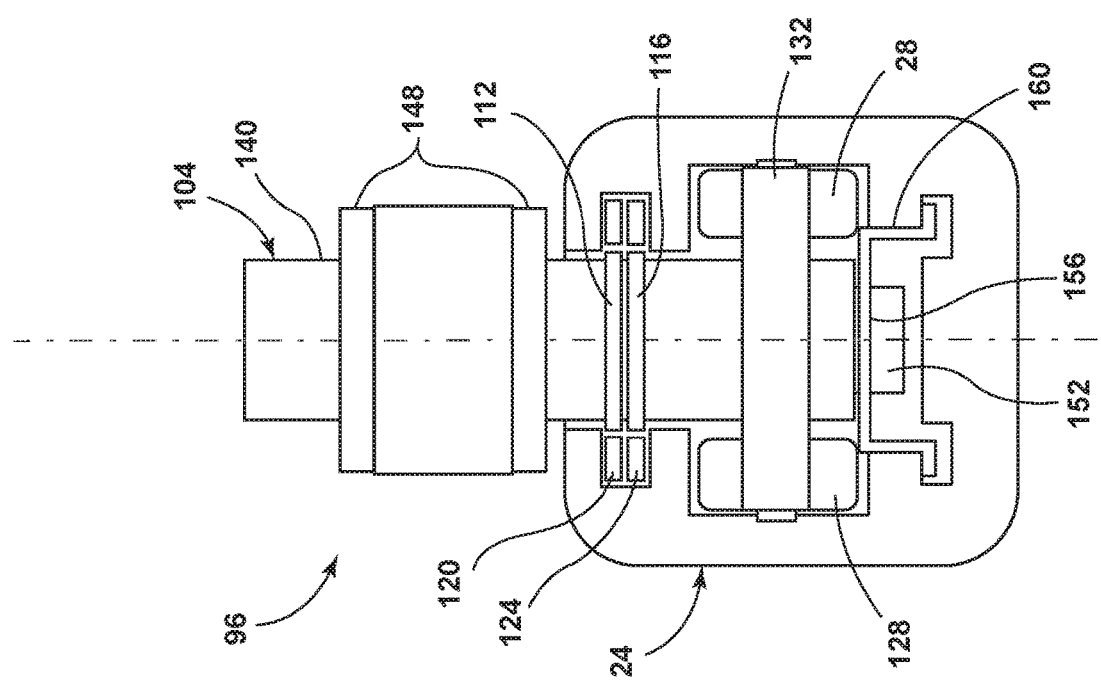
FIG. 4B is an end view of the individual track of the network of rails, illustrating the anchor engaged with the track and the actuation carriage in a raised position.
Figure 5B:
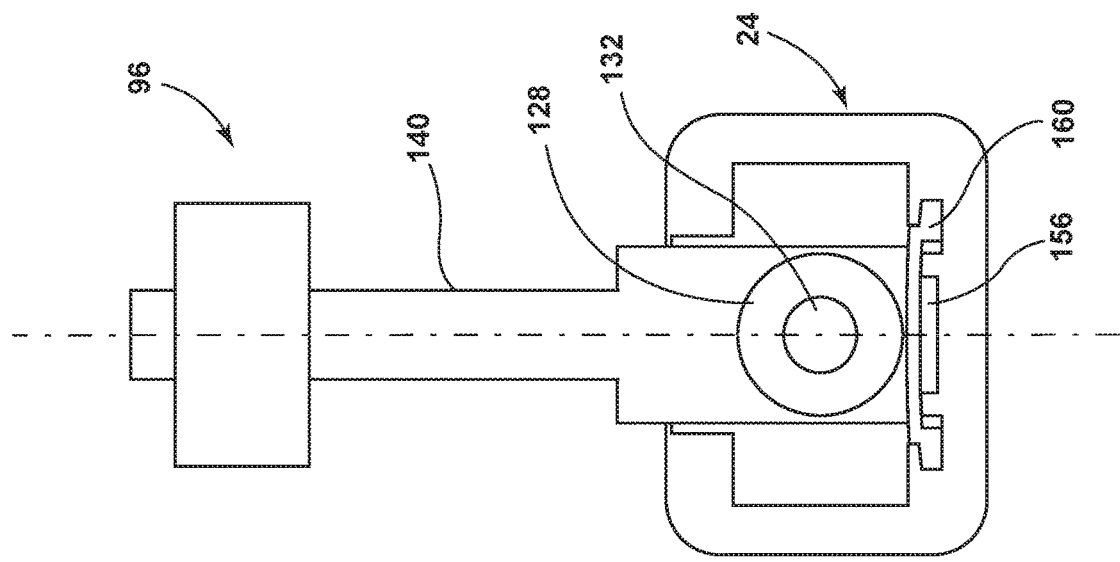
FIG. 5B is an end view of the individual track with the anchor in a disengaged position and lowered into the track, according to one example.
Figure 5A:
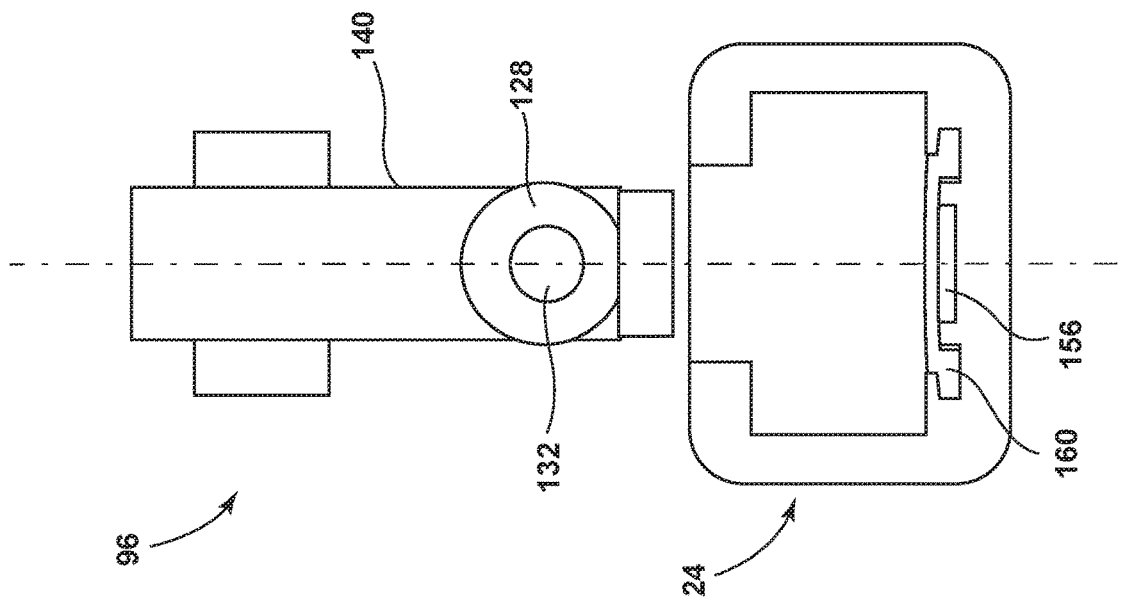
FIG. 5A is an end view of the individual track with the anchor in a disengaged position and raised out of the track, according to one example.
Figure 6:
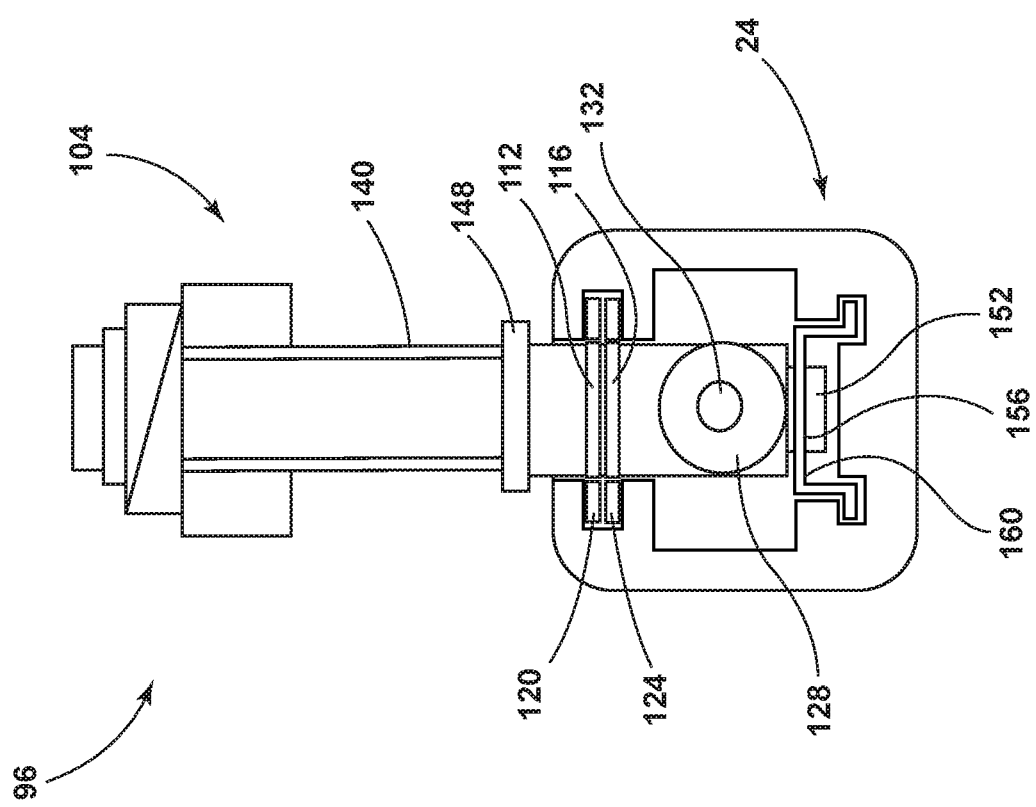
FIG. 6 is an end view of the individual track, illustrating an active anchor in the disengaged position and the actuation carriage in the raised position.
Figure 7:
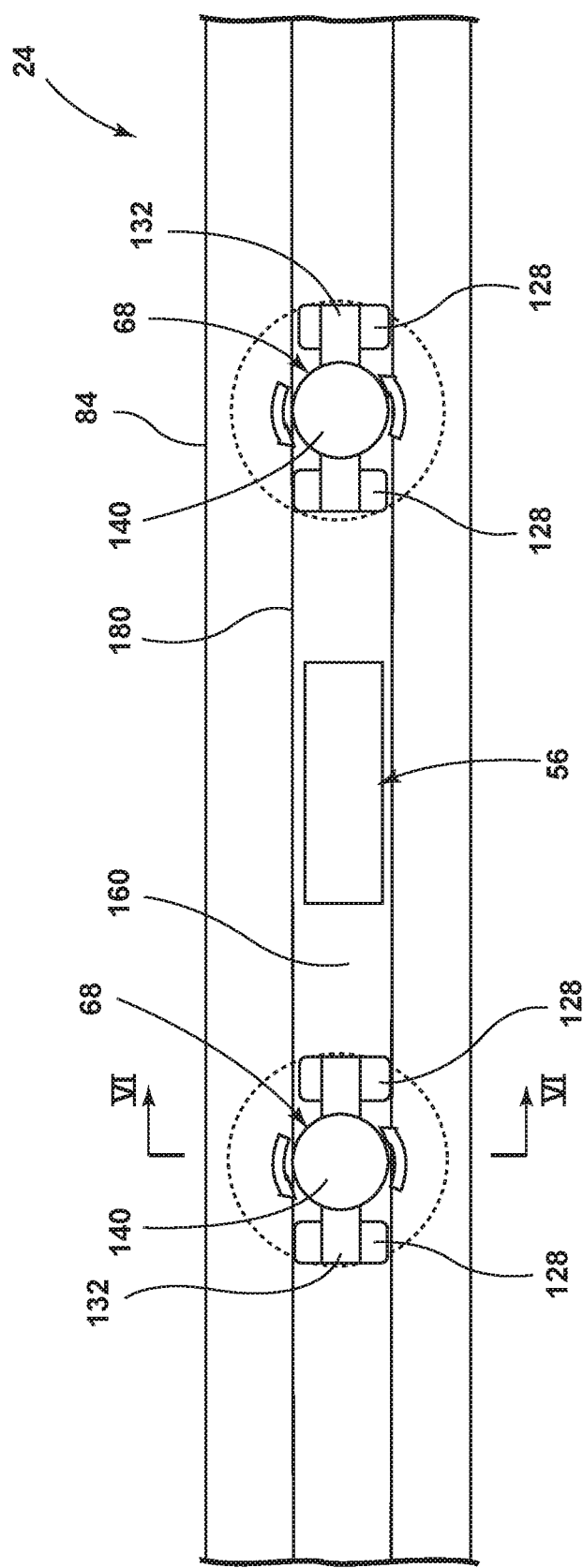
FIG. 7 is a top view of the seating assembly, illustrating the anchors in the disengaged position, according to one example.

Referring further to FIGS. 1A-1C, the lateral rails 28 and the longitudinal rails 36 connect with one another at an angle at the junctions 48. For example, the lateral rails 28 and the longitudinal rails 36 may meet at an angle of about ninety degrees (90°) to define the junctions 48. Alternatively, the lateral rails 28 and the longitudinal rails 36 may meet at angles that are greater than or less than about ninety degrees (90°) without departing from the concepts disclosed herein. In general, the lateral rails 28 and the longitudinal rails 36 are in a generally planar relationship with one another. Said another way, the network of rails 24, which includes the lateral rails 28 and the longitudinal rails 36, are configured to have corresponding heights, widths, and thicknesses to enable smooth and seamless transfer of the seating assemblies 56 and their associated anchors 68 throughout the extent of the network of rails 24 without resulting in binding or sticking of the anchors 68 within the network of rails 24.

Referring still further to FIGS. 1A-1C, the seating assemblies 56 can be arranged in a number of configurations that can distribute the seating assemblies 56 at various locations within the cabin 22 of the vehicle 20. For example, the seating assemblies 56 can be distributed across a first row of seating assemblies, a second row of seating assemblies, and/or a third row of seating assemblies. The first row of seating assemblies may be positioned proximate to a front 70 of the vehicle 20. The second row of seating assemblies may be positioned vehicle rearward of the first row of seating assemblies. The third row of seating assemblies may be positioned proximate a rear 72 of the vehicle 20. In some examples, a distance 76 between the lateral rails 28 may be substantially similar or equal to a distance 80 between the longitudinal rails 36. In other examples, the distance 76 between the lateral rails 28 may be different from the distance 80 between the longitudinal rails 36. In various examples, the vehicle 20 may be provided with the distance 76 between some of the lateral rails 28 as substantially similar or equal to the distance 80 between some of the longitudinal rails 36 while the distance 80 between other longitudinal rails 36 differs from the distance 76 between the lateral rails 28. In the depicted examples of FIGS. 1A-1C, the lateral rails 28 and the longitudinal rails 36 are generally provided in pairs that include individual tracks 84 that make up the network of rails 24. The distance 76 between the lateral rails 28 and the distance 80 between the longitudinal rails 36 can be substantially similar or equal to one another. However, the distance 76 between the lateral rails 28 and the distance 80 between the longitudinal rails 36 may differ. In various examples, the network of rails 24 may be provided with lateral rails 28 and/or longitudinal rails 36 that are spaced apart to varying degrees. One such example is depicted in FIGS. 1A-1C, the distance 76 between the lateral rails 28 and the distance 80 between the longitudinal rails 36 that are positioned in vehicle-outboard positions may be substantially similar or the same. However, the longitudinal rails 36 that extend a substantial length of the vehicle 20 and are positioned vehicle-inboard in the cabin 22 may have the distance 80 differ from the distance 76 between the lateral rails 28. Such an arrangement can be beneficial in allowing two larger outboard seats, like those positioned on either side of a middle seat in the second row of seats of FIG. 1A, to be transitioned from the second row of seats to the third row of seats. Additionally, the middle seat is often somewhat smaller in size than the outboard seats and the anchors 68 may also be positioned closer to one another in at least one of the lateral and the longitudinal directions due to the decreased footprint of the seating assembly 56. Therefore, the smaller distance 80 for the inboard longitudinal rails 36 can be utilized for transitioning the middle seat between the first, second, and third row of seats to accommodate various configurations of the cabin 22. The outboard seats can be referred to as thirty percent (30%) seats and the middle seat can be referred to as a twenty percent (20%) seat.

Referring yet again to FIGS. 1A-1C, adjustment of the seating assemblies 56 along the network of rails 24 will now be discussed according to one specific, non-limiting, example. More specifically, the transition of the cabin 22 from the configuration depicted in FIG. 1A to the configuration depicted in FIG. 1C will be discussed. The first row of seats in FIG. 1A is provided with two seating assemblies 56 positioned as outboard or 30% seats and the two seating assemblies 56 are separated by an open space in the lateral direction. The second row of seats in FIG. 1A is provided with two seating assemblies 56 positioned as outboard or 30% seats and the two seating assemblies 56 are separated by the middle or 20% seat. To transition from the arrangement in FIG. 1A to the arrangement in FIG. 1B, the middle seat in the second row of seats is actuated in a vehicle-forward direction along the longitudinal rails 36 toward the first row of seats. The middle seat then occupies the formerly open space between the two seating assemblies 56 in the first row of seats. Next, the outboard seats in the second row of seats are actuated toward one another along the lateral rails 28 until the anchors 68 are proximate to the longitudinal rails 36 that extend vehicle-rearward from the lateral rails 28. To transition from the configuration of FIG. 1B to the configuration of FIG. 1C, the outboard seats of the second row of seats are actuated toward the rear 72 of the vehicle 20 to be positioned as the third row of seats. Additionally, the middle seat is actuated along the longitudinal rails 36 from the first row of seats to the second row of seats. In such a configuration or arrangement, the middle seat may be utilized as one of the seating assemblies 56 or may be utilized for another function, such as the table 64 or the ottoman. In the depicted examples, two of the longitudinal rails 36 extend between the first row of seats and the third row of seats while the remaining longitudinal rails 36 extend between the first row of seats and the second row of seats. The lateral offset that results in the longitudinal rails 36 that extend from the first row of seats to the second row of seats and the longitudinal rails 36 that extend from the second row of seats to the third row of seats can be beneficial in allowing the seating assemblies 56 to fit in a lateral distance between a pair of wheel wells toward the rear 72 of the vehicle 20. By extending at least some of the longitudinal rails 36 between the first, second, and third rows of seats the user 60 can have a greater degree of freedom in configuring the cabin 22 of the vehicle 20. Additionally, the user 60 has the ability to move one or more of the seating assemblies 56 out of the way to allow the seating assemblies 56 space to transition between the various configurations without having to remove any of the seating assemblies 56 from the vehicle 20.

Referring to FIGS. 2-7, the seating assemblies 56 can be provided with an actuation carriage 96 coupled to an underside thereof. For example, the actuation carriage 96 may be coupled to an underside of a pair of seat tracks 100 or the actuation carriage 96 may be coupled through the pair of seat tracks 100. The pair of seat tracks 100 can enable horizontal actuation of the seating assembly 56 along the seat tracks 100 relative to the anchors 68 without adjusting a lateral or longitudinal position of the anchors 68 within the network of rails 24. The plurality of anchors 68 can include active anchors 104 and passive anchors 108. The active anchors 104 are provided with power and data connections that can communicate with controllers and onboard computer modules to convey various information about the seating assembly 56 (e.g., lateral position, longitudinal position, rotational position, occupancy status, comfort settings or preferences, various safety statuses, etc.) as well as provide power to various powered components that can be provided on the seating assemblies 56 (e.g., heating and ventilating of the seat assembly 56, seat adjustment motors, safety features, safety sensors, entertainment features, etc.). The power and data connections to the seating assemblies 56 can be facilitated by a power connector 112 and a data connector 116, respectively, that are provided on one or more of the active anchors 104. The power and data connectors 112, 116 are positioned and configured to engage with power sources 120 and data transmitters 124 that are provided in the network of rails 24. The power and data connectors 112, 116 are electrically coupled to the various components within the seating assemblies 56 that are powered and/or monitored. The active and passive anchors 104, 108 are each provided with rollers 128 that are positioned on either side of an axle 132 so as to allow the anchors 68 to roll along the network of rails 24 and/or along a floor surface 136 of the vehicle 20. The axle 132 is coupled to, and supported by, a post 140 that engages with the axle 132 in a generally perpendicular fashion.

Referring again to FIGS. 2-7, the active anchors 104 and/or the passive anchors 108 are configured to permit rotation of the post 140 about a vertical axis such that the rollers 128 can selectively engage, and be oriented with, the lateral rails 28 and the longitudinal rails 36 as the seating assembly 56 traverses the network of rails 24. The rotation of the post 140 about the vertical axis can be facilitated by a hand-actuated control (e.g., lever) or a powered control (e.g., motor). In either instance, all or part of the anchor 68 can rotate about the vertical axis. The power and data connectors 112, 116 can circumferentially extend from an exterior surface of the post 140 such that the power and data connectors 112, 116 can engage with the power sources 120 and the data transmitters 124, respectively, independent of a rotational position of the active anchor 104. The anchors 68 can be engaged with a support structure 144. For example, the anchors 68 may be provided with a plurality of flanges 148 that bracket the support structures 144 such that the anchor 68 rotatably engages with the support structure 144 while also being retained to the support structure 144.

Referring further to FIGS. 2-7, the anchors 68 can be provided with a locking pin 152 that passes through the post 140. For example, the active anchors 104 can be provided with the locking pin 152 while the locking pin 152 is omitted from the passive anchors 108. The locking pin 152 can be selectively engaged with one of a plurality of pin apertures 156 that are provided in a lower portion 160 of the lateral rails 28 and/or the longitudinal rails 36. The locking pin 152 can be actuated between a raised position (unlocked) to a lowered position (locked). The actuation of the locking pin 152 can be accomplished by a hand-actuated control or a motorized control. For example, a pin actuation assembly 164 can include an actuation head 168 and an actuation arm 172. In use, an actuation coupler 176 can be activated by a user, a computer, or a controller to initiate vertical motion of the actuation head 168, which in turn transmits the vertical motion to the actuation arm 172, which can affect the desired vertical actuation (raising or lowering) of the locking pin 152. In one example, the actuation arm 172 can initiate vertical actuation or motion of the support structure 144 to which the active anchors 104 are coupled which can result in a corresponding raising or lowering of the locking pin 152 and/or the anchor 68. In some examples, raising and lowering of the anchor 68 and the locking pin 152 can be accomplished by separate assemblies. Additionally or alternatively, according to various examples, the pin actuation assembly 164 may be responsible for a rotation of the anchors 68 about the vertical axis. For example, the actuation head 168 may be rotated ninety degrees (90°) about the vertical axis to affect a corresponding ninety-degree (90°) rotation of the anchor 68, thereby adjusting the orientation of the rollers 128 to engage and be aligned with a perpendicularly oriented portion of the network of rails 24. Additionally, the rotation of the anchor 68 about the vertical axis can be utilized in engaging and disengaging the seating assemblies 56 from the network of rails 24. For example, the rollers 128 can be rotated about the vertical axis to be coaxially aligned with a slot 180 in an upper portion of the individual tracks 84 (see FIG. 7). In such an orientation, the rollers 128 can be removed from the network of rails 24 by removing the seating assembly 56 from the vehicle 20. Similarly, the seating assembly 56 can be installed in the vehicle 20 by inserting the rollers 128 through the slot 180 and affecting a ninety-degree (90°) rotation of the rollers 128 by rotating the anchor 68 such that the rollers 128 nest within the structure of the individual tracks 84. In some examples, the active anchors 104 and the passive anchors 108 are horizontally and/or vertically offset from one another. The horizontal and/or vertical offset of the active anchors 104 and the passive anchors 108 can allow the seating assembly 56 to traverse an interior of the vehicle 20 regardless of whether the anchors 68 are actively engaged with the network of rails 24.

Figure 8:
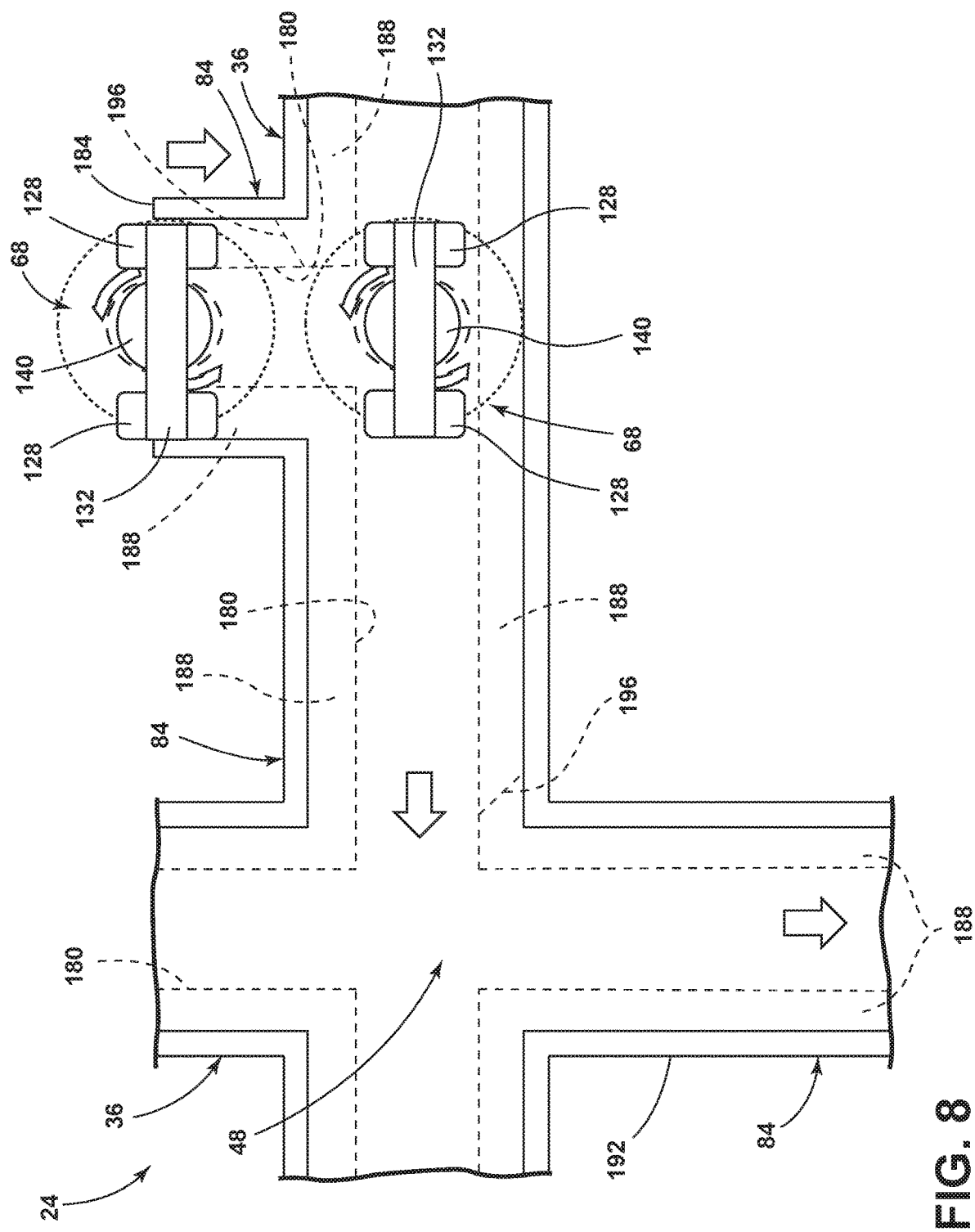
FIG. 8 is a top view of junctions of the network of rails with the anchors traversing a first longitudinal rail while the anchors are in an engaged position, according to one example.
Figure 9:
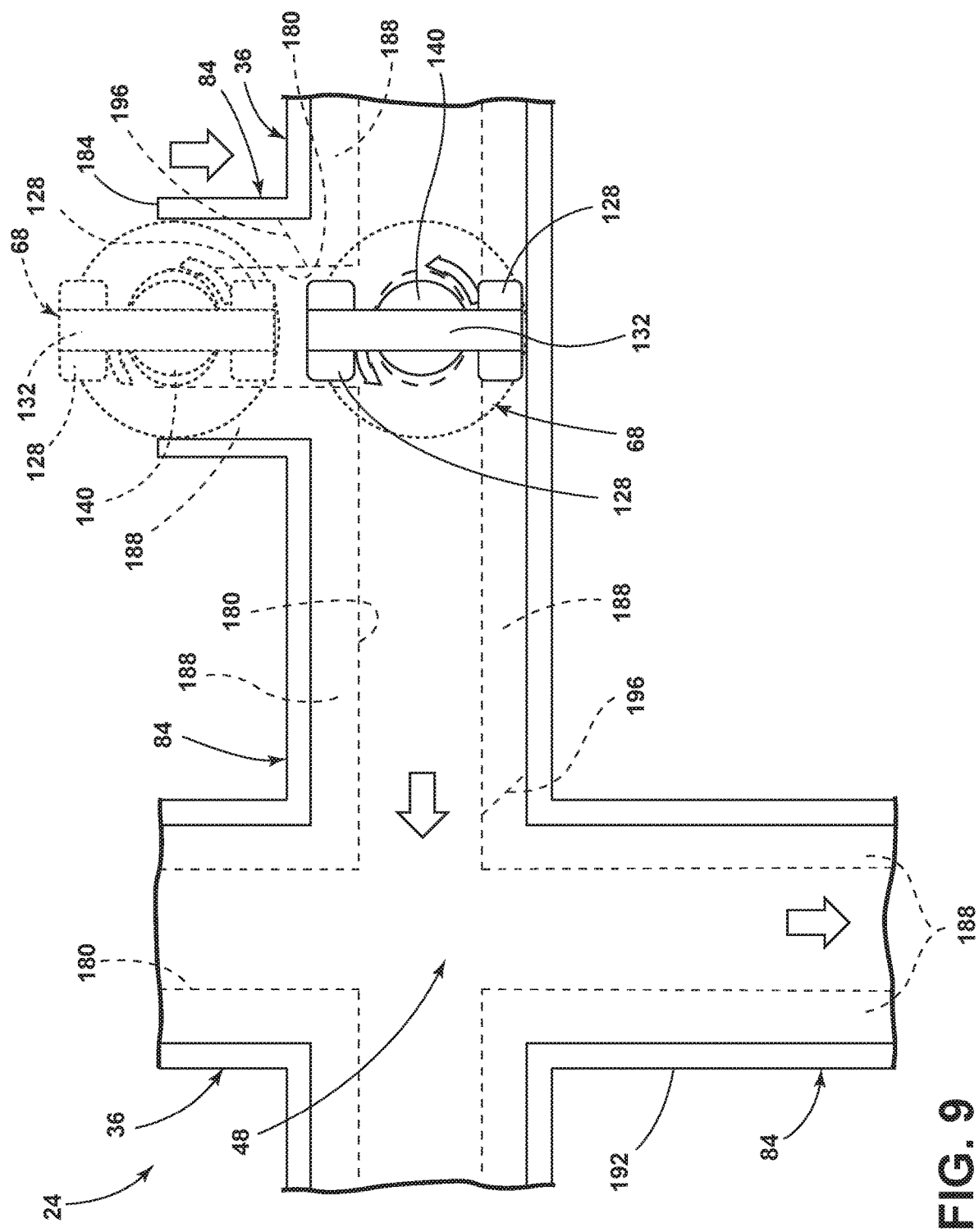
FIG. 9 is a top view of junctions of the network of rails with one of the anchors transitioning to a lateral rail while the other anchor is disengaged from the first longitudinal rail, according to one example.
Figure 10:
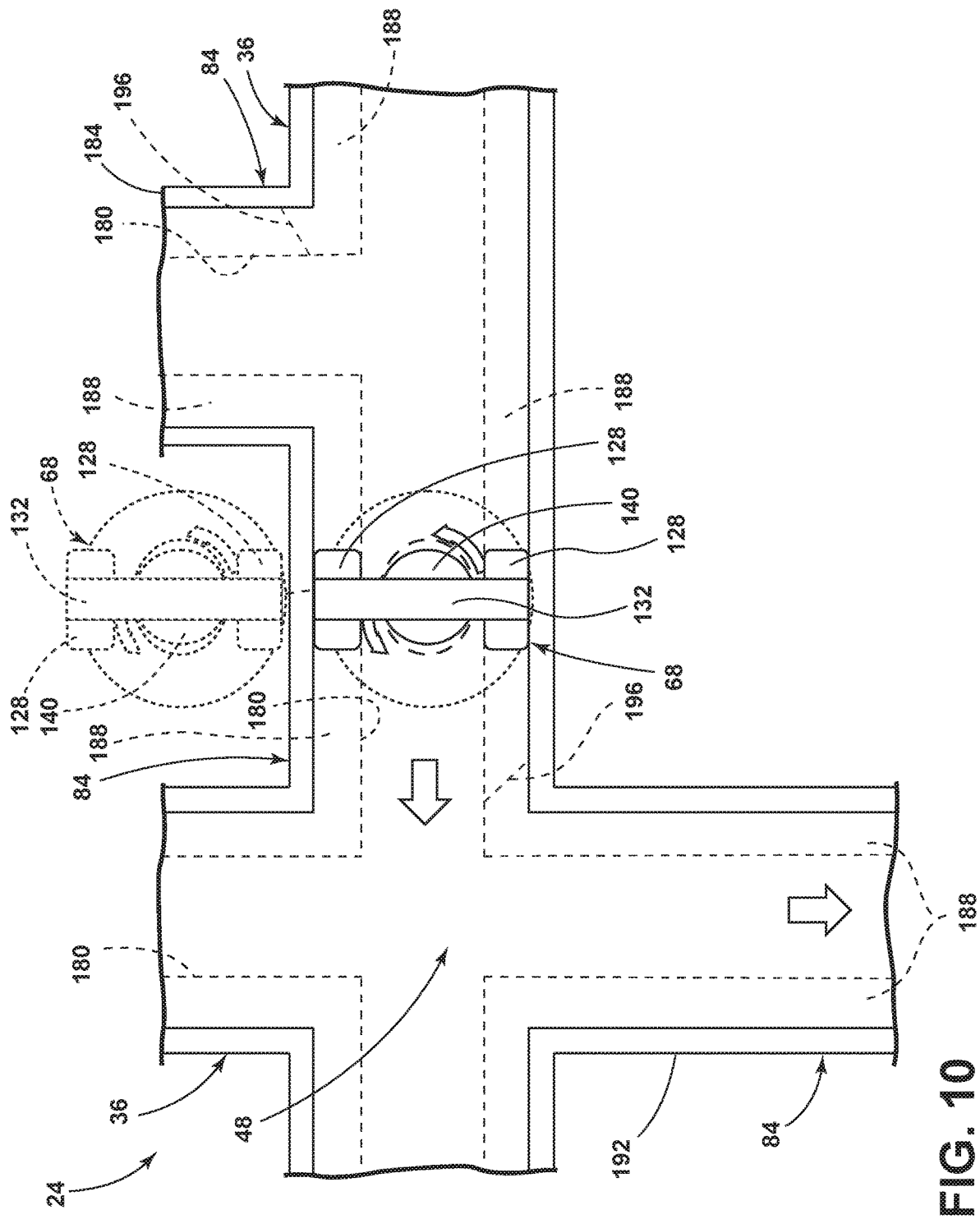
FIG. 10 is a top view of junctions of the network of rails with one of the anchors traversing the lateral rail while the other anchor is disengaged from the network of rails, according to one example.
Figure 11:
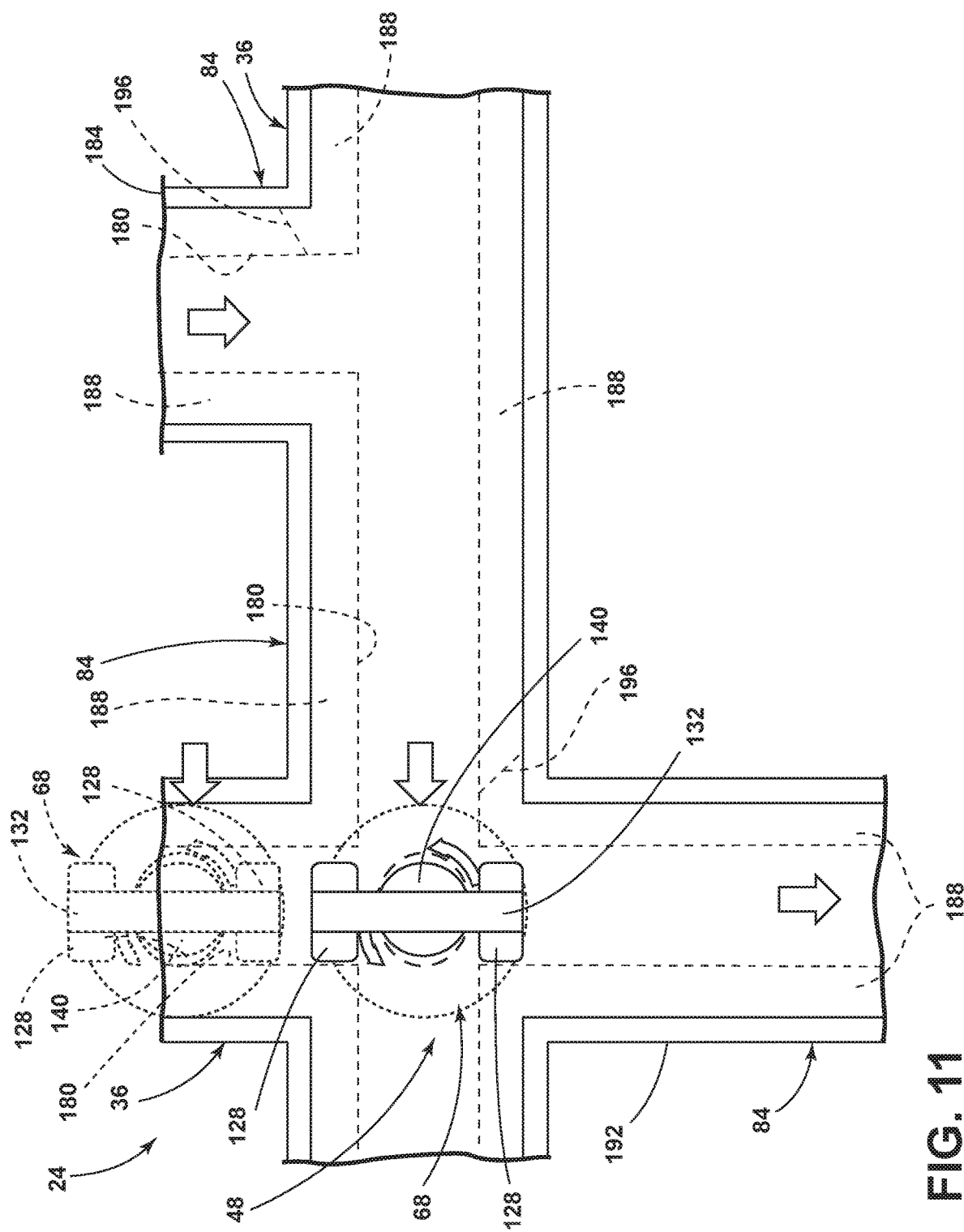
FIG. 11 is a top view of junctions of the network of rails with one of the anchors transitioning to a second longitudinal rail while the other anchor is disengaged from the second longitudinal rail, according to one example.
Figure 12:
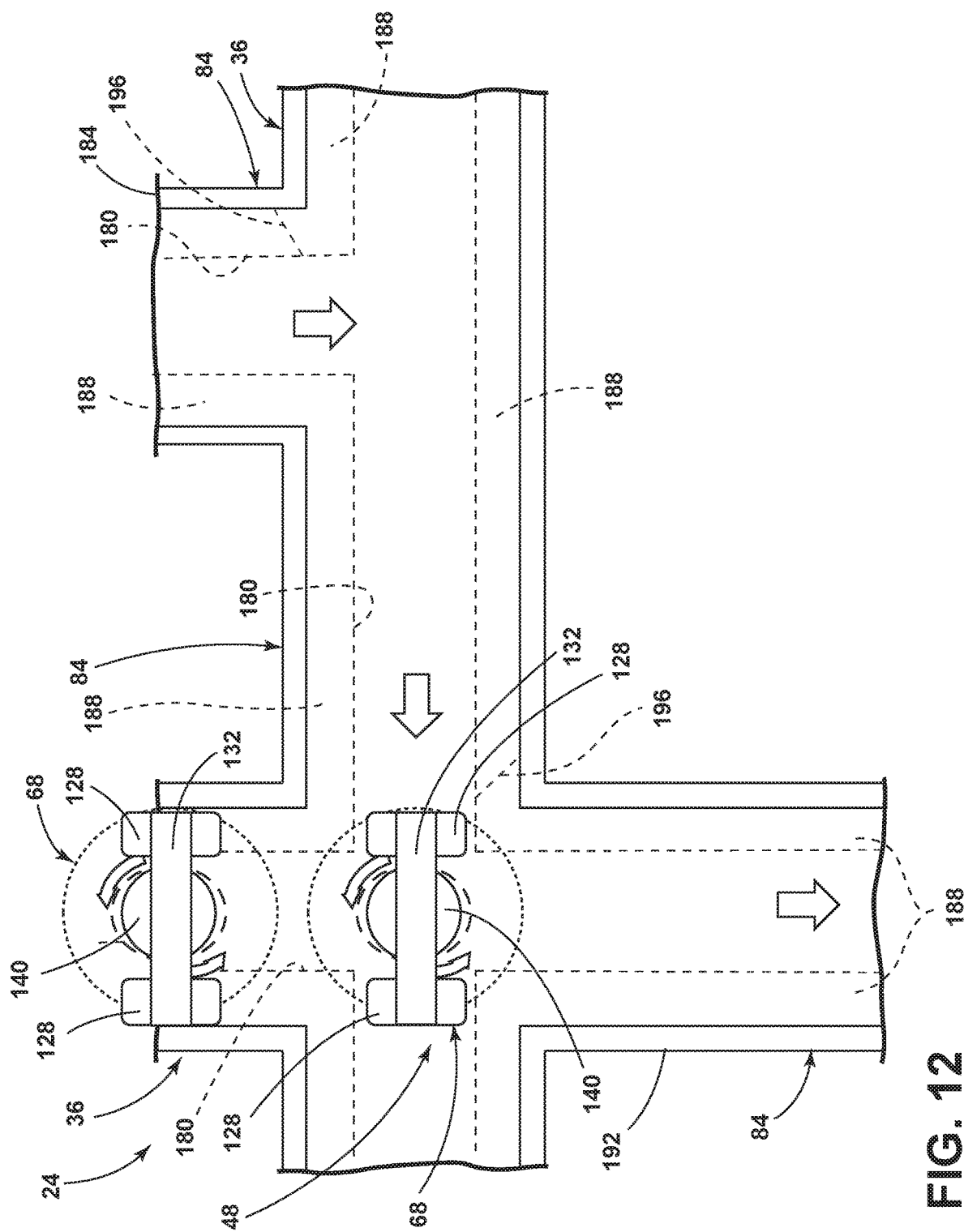
FIG. 12 is a top view of junctions of the network of rails with the anchors engaged with the second longitudinal rail, according to one example.

Referring now to FIGS. 8-13, a transition of the anchors 68 of the seating assembly 56 (FIG. 1A) from one of the longitudinal rails 36 to another of the longitudinal rails 36 along one of the lateral rails 28 is shown according to one, non-limiting, example. For brevity, the transition will be discussed with reference to the anchors 68 on a single side of the seating assembly 56. However, one of skill in the art will recognize that the transition outlined below may be applied simultaneously to an opposing side of the seating assembly 56 without departing from the concepts disclosed herein. Initially, the anchors 68 are engaged with a first longitudinal rail 184 (FIG. 8). The axle 132 that couples the rollers 128 together on each of the anchors 68 is in a position that allows the anchors 68 to be engaged with the first longitudinal rail 184. When the anchors 68 are in an engaged position with a given rail, the axle 132 is aligned in a generally perpendicular or substantially perpendicular manner with the slot 180 that is provided in the tracks 84. As the anchors 68 traverse the first longitudinal rail 184 toward the lateral rail 28, the rollers 128 are vertically retained within the network of rails 24 by retention protrusions 188 that define the slot 180. The retention protrusions 188 are shown in phantom dashed lines to indicate the retention protrusions 188 may be positioned vertically above the rollers 128 when the rollers 128 are engaged with the network of rails 24. The retention protrusions 188 can extend inward toward one another from opposing walls of a given track 84 such that a cross-section of the track 84 is generally U-shaped with upper portions of the U-shape extending toward one another. Said another way, the cross-section of the track 84 may resemble "C" shapes facing one another and having a line of symmetry. The retention protrusions 188 may have a width (i.e., distance from the wall of the track 84 toward a center or the track 84) that generally corresponds with a width of the individual rollers 128 such that vertical contact and/or loads as a result of the rollers 128 coming into contact with the retention protrusions 188 is dissipated or spread out over a larger surface area than if the retention protrusions 188 were not so proportioned. It may be beneficial for the width of the retention protrusions 188 to be greater than the width of the rollers 128 to permit additional horizontal clearance of the rollers 128 within the track 84, particularly as the anchors 68 are rotated about a vertical axis defined by the post 140. Once the anchor 68 that is proximate the lateral rail 28 reaches the lateral rail 28, the anchors 68 may be rotated about the vertical axis defined by the post 140 to transition from the first longitudinal rail 184 to the lateral rail 28. To transition from the first longitudinal rail 184 to the lateral rail 28, the anchor 68 may rotate about the vertical axis about ninety degrees (90°).

Referring again to FIGS. 8-13, the anchors 68 are horizontally offset from one another generally about a perimeter of the seating assembly 56 such that the user 60 (FIG. 1) seated in the seating assembly 56 is well supported and anchored to the vehicle 20 (FIG. 1). Accordingly, in some regions or configurations of the network of rails 24, less than all of the anchors 68 may be able to transition between a given longitudinal rail 36 and a given lateral rail 28. In such examples, the anchors 68 may be adjustable in a vertical direction (e.g., by way of the actuation carriage 96) such that the anchors 68 that are not actively engaged with the network of rails 24 may actively engage with the floor surface 136 or another portion of the cabin 22 of the vehicle 20 while the seating assembly 56 is transitioned from one location within the vehicle 20 to another location within the vehicle 20. The anchors 68 that are not actively engaged with the network of rails 24 at a given stage of the transition along the network of rails 24 are shown in phantom dashed lines (e.g., FIG. 10). When the anchors 68 have been rotated in preparation for the transition from the first longitudinal rail 184 to the lateral rail 28, the axles 132 may be generally aligned with the slot 180 such that the anchor(s) 68 that will be disengaged from the first longitudinal rail 184 can pass through the slot 180 and exit the first longitudinal rail 184 by vertical actuation while the anchor(s) 68 that will be engaged with the lateral rail 28 are oriented such that the axle 132 is generally or substantially perpendicular to the slot 180 that is defined by the lateral rail 28. Once the anchor(s) 68 that will be disengaged from the first longitudinal rail 184 have exited the first longitudinal rail 184 and the anchor(s) that will be transitioned and/or engaged with the lateral rail 28 are properly oriented with the lateral rail 28, the seating assembly 56 can be actuated along the lateral rail 28 in the direction of a second longitudinal rail 192. While the seating assembly 56 is being actuated along the lateral rail 28, the anchor(s) 68 that remain engaged with the network of rails 24 (e.g., the lateral rail 28) travel within the network of rails 24 and the anchor(s) 68 that are disengaged from the network of rails 24 may travel along the floor surface 136.

Referring further to FIGS. 8-13, once the anchors 68 reach the second longitudinal rail 192, the axles 132 of the anchors 68 are aligned with the second longitudinal rail 192 in a generally parallel manner. Said another way, the axles 132 of the anchors 68 are generally parallel with the slot 180 in the second longitudinal rail 192 once the anchors 68 reach the second longitudinal rail 192 (see FIG. 11). In examples where the anchor(s) 68 that are not actively engaged with the lateral rail 28 during traversal of the seating assembly 56 along the lateral rail 28 are actuated in a vertical direction to roll, ride along, or generally engage with the floor surface 136 as the seating assembly 56 is transitioned along the lateral rail 28, upon reaching the second longitudinal rail 192, the anchor(s) 68 can be actuated vertically downward through the slot 180 and into the second longitudinal rail 192. Once the anchor(s) 68 have been reengaged with the second longitudinal rail 192, the anchor(s) 68 can be rotated about the vertical axis defined by the post 140 to actively engage with the second longitudinal rail 192. The anchor(s) 68 that were engaged with the lateral rail 28 during traversal of the seating assembly 56 along the lateral rail 28 can rotate about the vertical axis defined by the post 140 simultaneously with the rotation of the anchor(s) 68 that were not engaged with the lateral rail 28 as the seating assembly 56 transitioned between the first and second longitudinal rails 184, 192. Alternatively, the anchor(s) 56 that were engaged with the lateral rail 28 and the anchor(s) 56 that were not engaged with the lateral rail 28 during the transition between the first and second longitudinal rails 184, 192 can rotate about their respective vertical axes in a sequential manner. For example, the anchor(s) 68 that were engaged with the lateral rail 28 can rotate about the vertical axis defined by their post(s) 140 and the anchor(s) 68 that were not engaged with the lateral rail 28 can rotate about their post(s) 140 after the anchor(s) 68 that were engaged with the lateral rail 28 have initiated their rotation about the vertical axis. The anchor 68 shown in phantom dashed lines in FIG. 11 may be vertically offset from the anchor 68 that is shown in solid lines. Once the vertically offset anchor 68 enters the second longitudinal rail 192, the anchor 68 can be rotated to engage with the second longitudinal rail 192 such that the axle 132 is generally or substantially perpendicular to the slot 180. Once the anchors 68 have been engaged with the second longitudinal rail 192 by rotating the anchors 68 about the vertical axes defined by their posts 140 (see FIGS. 12 and 13), then the seating assembly 56 can be actuated along the second longitudinal rail 192.

Referring still further to FIGS. 8-13, the network of rails 24 may be provided with strategically positioned actuation protrusions 196, in some examples. The actuation protrusions 196 may passively initiate the rotation of the anchors 68 about the vertical axis defined by their posts 140 as the anchors 68 approach one of the junctions 48 in the network of rails 24. The actuation protrusions 196 can therefore simplify, to some extent, the number of operation steps utilized to complete a transition of the seating assembly 56 from one region of the cabin 22 of the vehicle 20 to another region of the cabin 22 of the vehicle 20 along the network of rails 24. The actuation protrusions 196 can be positioned along some or all of the individual tracks 84 and may be provided with varying lengths.

The vehicle 20 may be a motor vehicle, such as an automobile, a watercraft, an aircraft, and/or a land vehicle. The seating assemblies 56 may accordingly be referred to as vehicle seating assemblies 56 in some examples. The actuation carriage 96 can be coupled to an underside of the seating assembly 56 with a plurality of the anchors 68 extending from the actuation carriage 96. Each of the anchors 68 may be rotatable about a fixed vertical axis, such as a vertical axis defined by the post 140. While the anchors 68 may rotate about a fixed vertical axis, this does not exclude the ability of the seating assembly 56 to move about the vehicle 20. Accordingly, the fixed vertical axis may be a fixed vertical axis relative to the seating assembly 56 and/or the anchor 68. Each of the anchors 68 may be provided with a plurality of the rollers 128 that are coupled to the anchor 68 by the axle 132. In the depicted examples, the seating assemblies 56 are installed in the vehicle 20. The seating assemblies 56 selectively engage with the network of rails 24 and the network of rails 24 is positioned in the cabin 22 of the vehicle 20. The anchors 68 can include the active anchors 104 and the passive anchors 108. The active anchors 104 can be provided with at least one of power connectors 112 and/or data connectors 116. The network of rails 24 can be provided with the power source 120 that is engaged by the power connectors 112 in various examples. Additionally or alternatively, the network of rails 24 can be provided with the data transmitters 124 that engage with the data connectors 116. The axles 132 define a horizontal axis of rotation of the rollers 128. The rollers 128 may remain substantially fixed in longitudinal and lateral directions relative to the anchors 68 while maintaining their ability to rotate. Adjusting the lateral positioning of the seating assemblies 56 relative to one another at various locations within the cabin 22 of the vehicle 20 can enable greater freedom in the configuring of the cabin 22. Such additional configuring options can be beneficial for increasing seating capacity, increasing cargo room, increasing user 60 comfort with greater spacing from additional users 60, and/or allowing intermediate rows of seating assemblies 56 to be actuated rearward (e.g., between rearward wheel wells).

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A vehicle seating assembly, comprising:
an actuation carriage coupled to an underside of the vehicle seating assembly;
a plurality of anchors extending from the actuation carriage, each of the anchors being rotatable about a vertical axis; and
a plurality of rollers rotatably coupled to each of the anchors by an axle.

2. The vehicle seating assembly of claim 1, wherein the vehicle seating assembly is installed in a vehicle.

3. The vehicle seating assembly of claim 2, wherein the plurality of anchors selectively engage with a network of rails positioned in a cabin of the vehicle.

4. The vehicle seating assembly of claim 3, wherein the plurality of anchors comprise active anchors and passive anchors.

5. The vehicle seating assembly of claim 4, wherein the active anchors are provided with at least one of power connectors and data connectors.

6. The vehicle seating assembly of claim 5, wherein the network of rails are provided with a power source that is engaged by the power connectors.

7. The vehicle seating assembly of claim 5, wherein the network of rails are provided with data transmitters that engage with the data connectors.

8. The vehicle seating assembly of claim 1, wherein the axle defines a horizontal axis of rotation of the rollers.

9. The vehicle seating assembly of claim 1, wherein the rollers remain substantially fixed in longitudinal and lateral directions relative to the anchors.

10. A vehicle seating assembly, comprising:
an actuation carriage coupled to an underside of the vehicle seating assembly,
a plurality of anchors extending from the actuation carriage, each of the anchors being rotatable about a vertical axis; and
a plurality of rollers rotatably coupled to each of the anchors by an axle, the axle defining a horizontal axis of rotation, and the rollers remaining substantially fixed in longitudinal and lateral directions relative to the anchors.

11. The vehicle seating assembly of claim 10, wherein the plurality of anchors selectively engage with a network of rails positioned in a cabin of a vehicle.

12. The vehicle seating assembly of claim 11, wherein the plurality of anchors comprise active anchors and passive anchors.

13. The vehicle seating assembly of claim 12, wherein the active anchors are provided with at least one of power connectors and data connectors.

14. The vehicle seating assembly of claim 13, wherein the network of rails are provided with a power source that is engaged by the power connectors.

15. The vehicle seating assembly of claim 13, wherein the network of rails are provided with data transmitters that engage with the data connectors.

16. A vehicle, comprising:
a vehicle seating assembly;
an actuation carriage coupled to an underside of the vehicle seating assembly;
a network of rails positioned in a cabin of the vehicle;
a plurality of anchors extending from the actuation carriage to engage with the network of rails, each of the anchors being rotatable about a fixed vertical axis; and
a plurality of rollers rotatably coupled to each of the anchors by an axle, the axle defining a horizontal axis of rotation, and the rollers remaining substantially fixed in longitudinal and lateral directions relative to the anchors.

17. The vehicle seating assembly of claim 16, wherein the plurality of anchors comprise active anchors and passive anchors.

18. The vehicle seating assembly of claim 17, wherein the active anchors are provided with at least one of power connectors and data connectors.

19. The vehicle seating assembly of claim 18, wherein the network of rails are provided with a power source that is engaged by the power connectors.

20. The vehicle seating assembly of claim 18, wherein the network of rails are provided with data transmitters that engage with the data connectors.

* * * * *